United States Patent
Inglese et al.

(10) Patent No.: US 7,593,358 B2
(45) Date of Patent: Sep. 22, 2009

(54) TRANSMISSION DEVICE FOR REMOTE CONTROL SYSTEMS

(75) Inventors: Alessandro Inglese, S. Giovanni La Punta (IT); Edmondo Gangi, Sant'Agata Li Battiati (IT); Giuseppe Rotondo, Messina (IT); Gaetano Di Stefano, Palermo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 705 days.

(21) Appl. No.: 11/067,461

(22) Filed: Feb. 25, 2005

(65) Prior Publication Data
US 2005/0201756 A1    Sep. 15, 2005

(30) Foreign Application Priority Data
Mar. 1, 2004    (EP)    ................... 04425129

(51) Int. Cl.
*H04B 7/00* (2006.01)
*G08C 19/12* (2006.01)
*H04L 17/02* (2006.01)
*H04N 7/14* (2006.01)

(52) U.S. Cl. ............... 370/310; 341/173; 341/175; 341/181; 341/187; 348/14.05; 375/265; 375/310; 375/344

(58) Field of Classification Search ............ 370/217, 370/218, 219, 222, 238, 238.1, 310.1, 315, 370/351, 352, 353, 354, 355, 356, 357, 389, 370/395.1, 395.72, 408, 419, 473, 474

See application file for complete search history.

(56) References Cited

U.S. PATENT DOCUMENTS

| | | | |
|---|---|---|---|
| 4,189,669 A * | 2/1980 | van Loon et al. | 318/811 |
| 4,231,031 A | 10/1980 | Crowther et al. | 340/695 |
| 4,623,887 A | 11/1986 | Welles, II | 340/825.57 |
| 4,788,542 A | 11/1988 | Tanabe | 340/825.31 |
| 5,226,062 A * | 7/1993 | Fluharty | 375/286 |
| 5,815,536 A * | 9/1998 | Abe | 375/344 |
| 6,271,831 B1 * | 8/2001 | Escobosa et al. | 345/158 |
| 6,781,539 B2 * | 8/2004 | Matsui | 341/176 |
| 2001/0034213 A1 | 10/2001 | Tsui | 455/92 |
| 2002/0114399 A1 * | 8/2002 | Piroozi et al. | 375/257 |
| 2002/0118769 A1 * | 8/2002 | Karaoguz | 375/265 |
| 2002/0163440 A1 * | 11/2002 | Tsui | 340/825.69 |
| 2004/0183469 A1 * | 9/2004 | Lin et al. | 315/247 |
| 2004/0257024 A1 * | 12/2004 | Marando et al. | 318/647 |
| 2005/0128970 A1 * | 6/2005 | Tsien et al. | 370/315 |

* cited by examiner

*Primary Examiner*—Gregory B Sefcheck
*Assistant Examiner*—Salvador E Rivas
(74) *Attorney, Agent, or Firm*—Lisa K. Jorgenson; Timothy L. Boller; Seed IP Law Group PLLC

(57) ABSTRACT

Transmitter device including a modulator apparatus for the generation of a modulated digital signal in a remote control system. The modulated signal is defined by at least one characteristic quantity correlated to an information to transmit. The modulator apparatus is characterized by including a finite states machine for generating a modulating digital signal to combine with a carrier signal and obtain the modulated signal. The finite states machine generates the modulating signal on the basis of digital data corresponding to said at least one characteristic quantity.

32 Claims, 11 Drawing Sheets

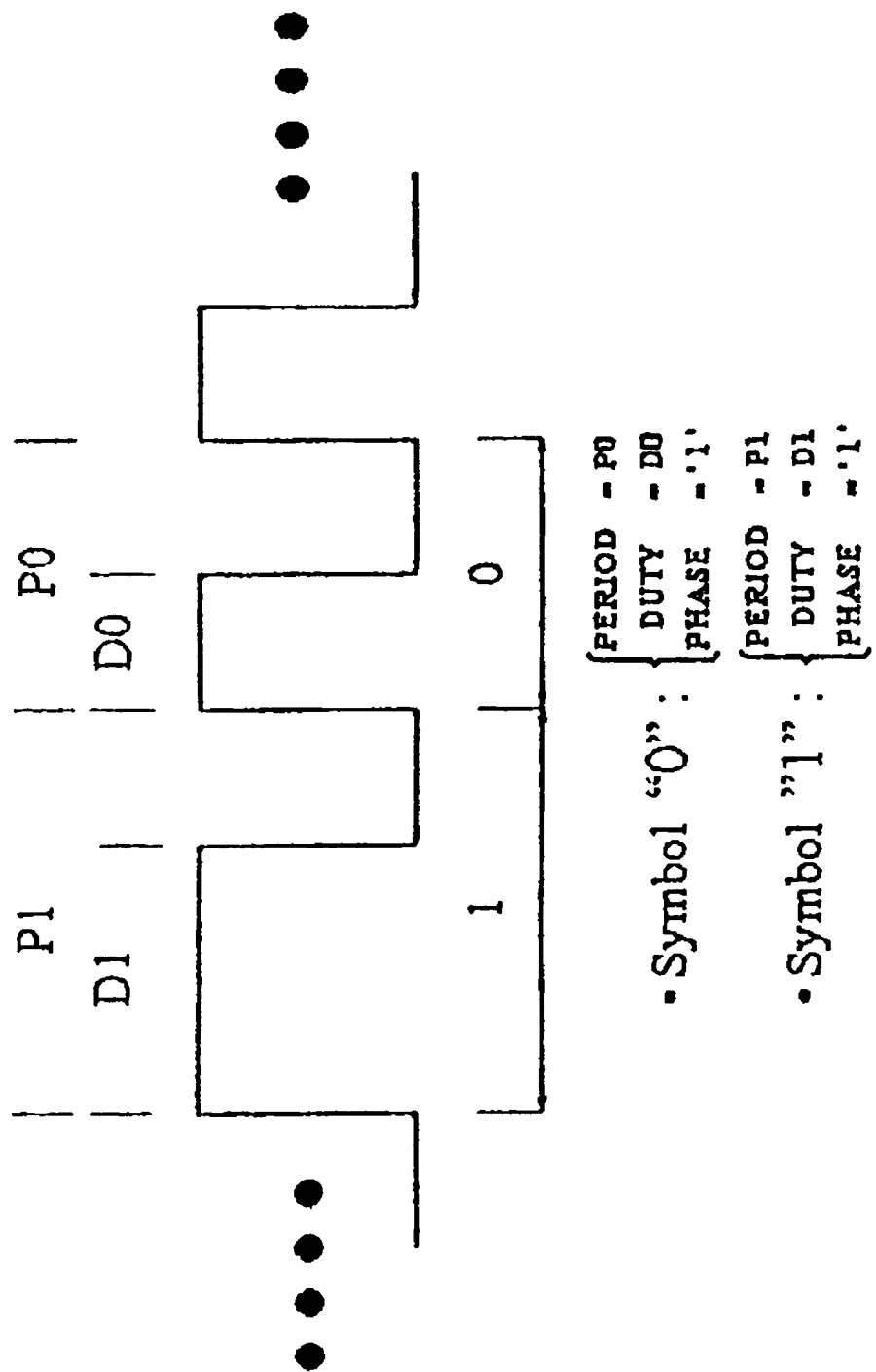

TRANSMISSION DEVICE FOR REMOTE CONTROL SYSTEMS

BACKGROUND OF THE INVENTION

1. Field of the Invention

The present disclosure generally relates to remote control systems and, particularly but not exclusively, it relates to systems operating by transmitting infrared radiation (known as "Infrared Remote Control System").

2. Description of the Related Art

Remote control systems are used for commanding various types of apparatus such as, for example, televisions or gate automations. These remote control systems are known to comprise a transmitter provided, typically, with one or more buttons with which the user selects the command to be transmitted to a receiving apparatus connected to the appliance to be commanded.

Following the action on the button, inside the transmitter a modulated digital signal is generated that transports the digital information to be transmitted which, in turn, is used to pilot a source of light, such as an infrared led which emits radiation towards the receiver. This modulated signal is, generally, of a pulse type in which the position and/or width of the impulse codify the digital information. For example, the best known of the codings used for generating the digital signal is the RC5 coding, proposed by Sony, and according to which the symbol 0 and the symbol 1 are differentiated by a different position of the pulse (that is of the high logic level) within the overall duration interval of the symbol.

It has been observed that the impulse generation modality, and thus the modulated signal generation modality, have particular importance for the efficiency and costs of production of the transmitter.

Transmitters for control systems are known in which the modulated signal is entirely generated by software, by means of suitable algorithms performed by a microcontroller.

This generation by software does not appear satisfactory in that it requires excessively high calculation times in relation to the relative simplicity of the codes of the modulated signal and, moreover, it translates into a software overload which, as a whole, degrades the performance of any microcontroller not dedicated to the abovementioned object.

Different solutions are also known, in which the modulated signal is generated by a complex network of discrete circuit elements that have high costs of production and the disadvantage of not permitting a reconfiguration in time in order to respond, for example to an optional need to use different types of coding.

BRIEF SUMMARY OF THE INVENTION

An embodiment of the present invention provides a transmitter for remote control systems that overcomes the abovementioned disadvantages and limitations of the prior art.

Embodiments for a transmission device, a modulator apparatus, and a method for generating a modulated signal are provided. Embodiments of other aspects of the invention are also provided.

BRIEF DESCRIPTION OF THE SEVERAL VIEWS OF THE DRAWINGS

In order to better understand the invention and appreciate the advantages thereof, some non-limiting and non-exhaustive embodiments are described below, with reference to the appended drawings Wherein:

FIGS. 7A, 7B, 7C show trends of the modulating signal in the case of Pulse Coding, Space Coding and Shift Coding, respectively;

DETAILED DESCRIPTION

Embodiments of a transmission device for remote control systems are described herein. In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
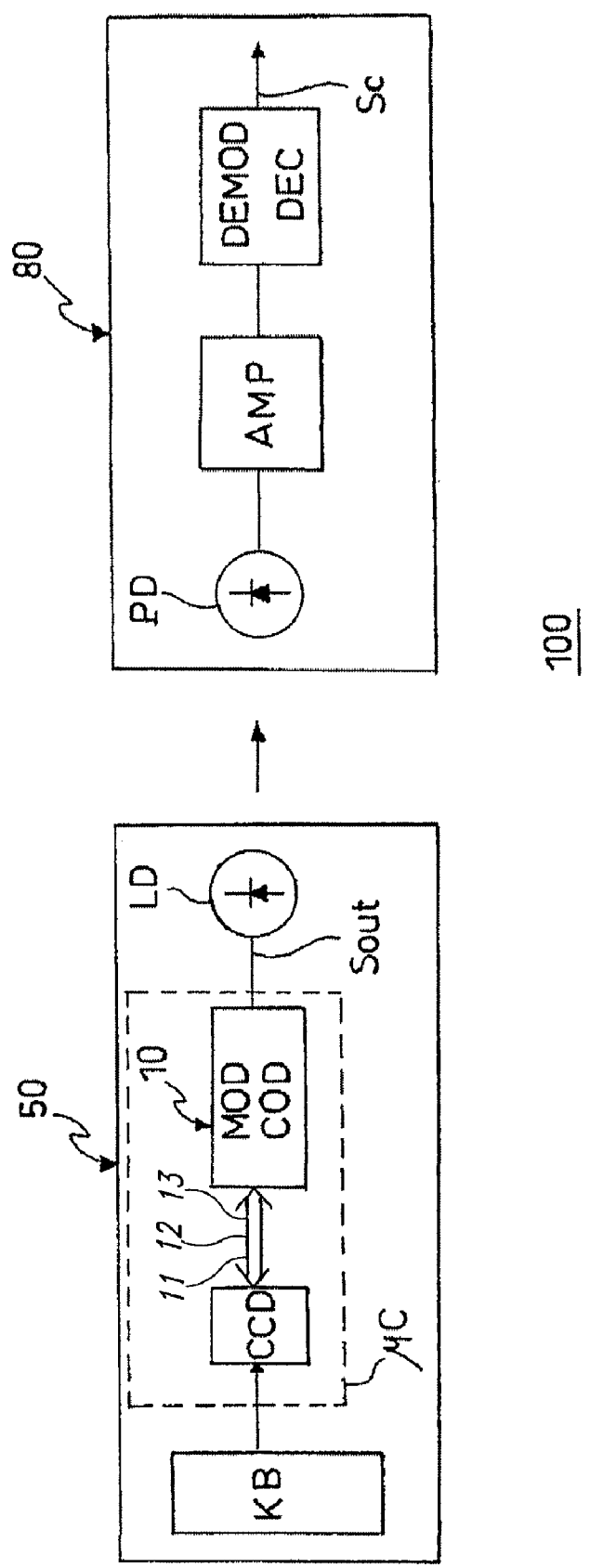
FIG. 1 shows a block diagram of an example remote control system, in accordance with one embodiment of the invention.

FIG. 1 schematically shows an example of a remote control system 100 that can be made in accordance with one embodiment of the invention and including a transmitter 50 and a receiver 80. It should be noted that the remote control system 100 is of the type that can be used for the remote control of different types of apparatus such as, for example, televisions and gate automations.

According to one particular example, the transmitter 50 includes a keyboard KB provided with one or more buttons that can be activated by a user and connected to a central control device or system CCD. The central control device CCD is, for example, the core of a microcontroller µC and comprises the central processing unit of the microcontroller itself. As will be clear later, the central control device CCD in addition to serving the function of generating suitable control signals also serves the function of generating a carrier signal Carr starting from a suitable clock signal. The central control device CCD is connected to a modulator apparatus 10 (MOD-COD) for supplying to this control signals 11, digital data 12 and the carrier signal Carr 13. The modulator 10 is such to provide a modulated signal Sout, obtained by applying a particular coding law.

The modulator apparatus 10 is connected to a diode LD such as to emit, for example, infrared radiation IR that transports the information corresponding to the button selected by the user and codified in the modulated signal Sout.

The receiver 80 may be of the conventional type and comprise a photodiode PD for converting the infrared radiation IR into an electric signal. The photodiode PD is connected electrically, for example by means of an amplifier AMP, to a demodulator and decodifier apparatus DEMOD-DEC, known per se, which sends an electric command signal Sc to the apparatus to be commanded (not shown).

It should be noted that, advantageously, the modulator apparatus 10 is a hardware device that can preferably be made by integration on the same chip or plate of semiconductor material on which the microcontroller μC is made, thus forming a peripheral entity of the microcontroller itself. The representation of FIG. 1, according to which the modulator apparatus is shown inside the microcontroller μC relates precisely to this particular though non-limiting embodiment.

Figure 2:
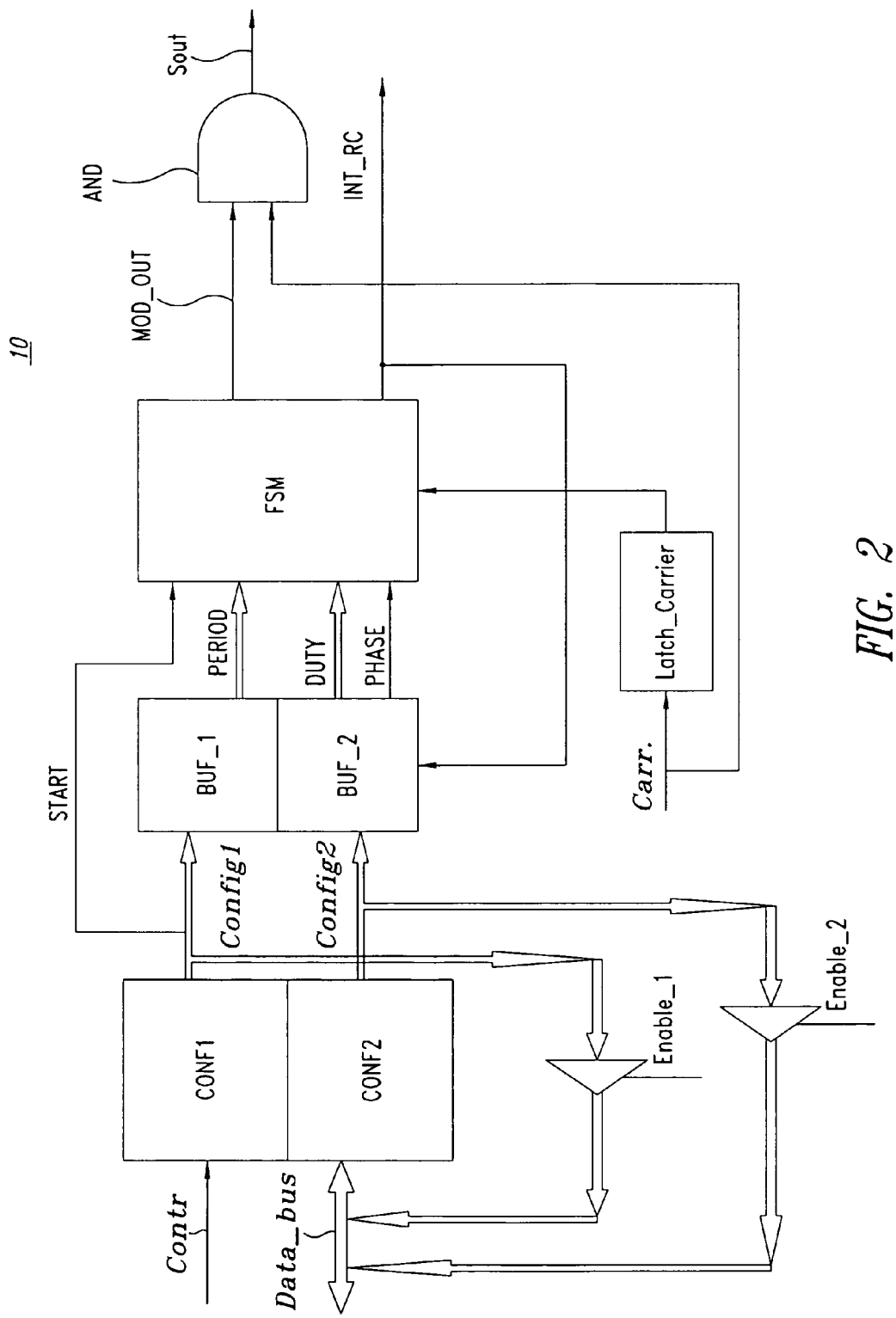
FIG. 2 schematically shows an example of architecture of a modulator apparatus that can be used in a transmitter of the system in FIG. 1.

FIG. 2 shows in a schematic way an example of the architecture of the modulator apparatus 10 comprising memorization means (such as, a first CONF1 and a second CONF2 configuration register), a device FSM for generating a modulating electric signal MOD_OUT and combination means of the modulating signal MOD_OUT with the carrier electric signal Carr (made, for example, by a logic port AND).

The combination of the modulating signal MOD_OUT and the carrier signal Carr enables to generate the modulated electric signal Sout on a homonymous output of the logic port AND.

Figure 3A:
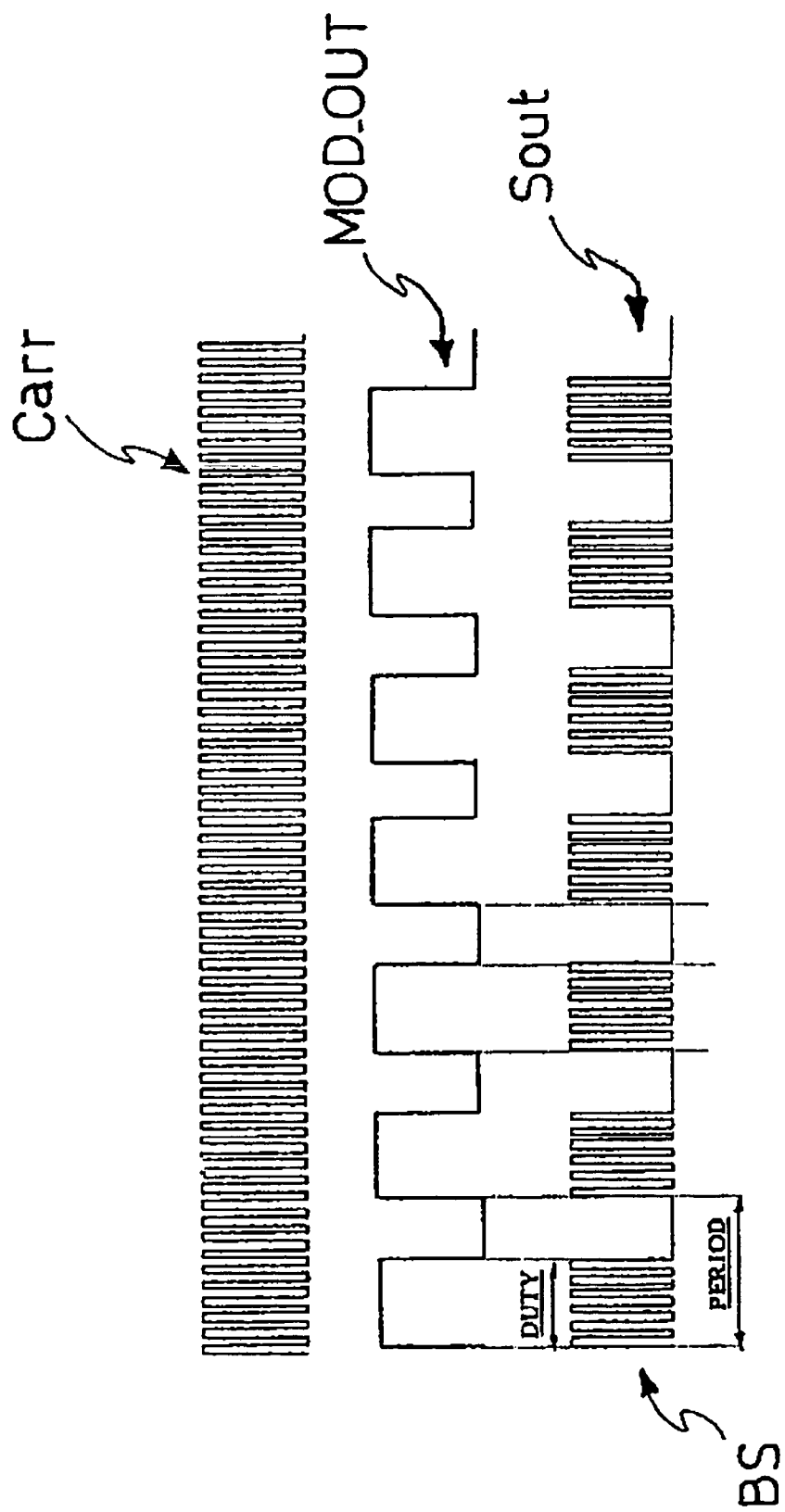
FIG. 3A shows example trends of a carrier signal, a modulating signal and a corresponding modulated signal.

Before describing in greater detail the architecture of the modulator apparatus 10, refer to FIG. 3A which shows example trends of the carrier signal Carr, the modulating signal MOD_OUT and the modulated signal Sout.

The carrier signal Carr is a square wave having a frequency fcarr that, for example, ranges between 30 KHz and 80 KHz (period Tcarr ranging between approximately 13 μs and 33.3 μs). The modulating signal MOD_OUT is a pulse-type digital signal constructed in a dependent way from the particular preselected coding and such to constitute an envelope curve for the carrier signal Carr.

The modulated signal Sout is a pulse digital signal representative of binary symbols BS that is symbols representative of the logic value 1 or 0. Each BS signal is defined by one or more characteristic quantities such as duration, indicated in FIG. 3A with the caption PERIOD, and the duty-cycle or use factor, indicated with the caption DUTY. As is evident to those skilled in the art, the duty-cycle DUTY is indicative of the interval of time inside the symbol during which there is a non zero pulse. Each binary symbol BS comprises a period number of the carrier Carr. In the particular example in FIG. 3A, the modulated signal Sout is a train of signals equal to one another and the duration PERIOD and the duty-cycle DUTY constitute the period and the factor of use of the modulating signal MOD_OUT respectively.

As shown in FIG. 2, the apparatus 10 is provided with an input Contr for control signals and an input Data_Bus for digital configuration data, connected to the configuration registers CONF1 and CONF2. The control signals and the configuration data, available on inputs Contr and Data_Bus, are supplied by the central control device CCD of the microcontroller μC with suitable timeframes. Besides, the central control device CCD can read the data stored in the first and second register CONF2 and CONF1 by enabling the corresponding outputs by enabling signals Enable-1 and Enable_2.

Figure 4:
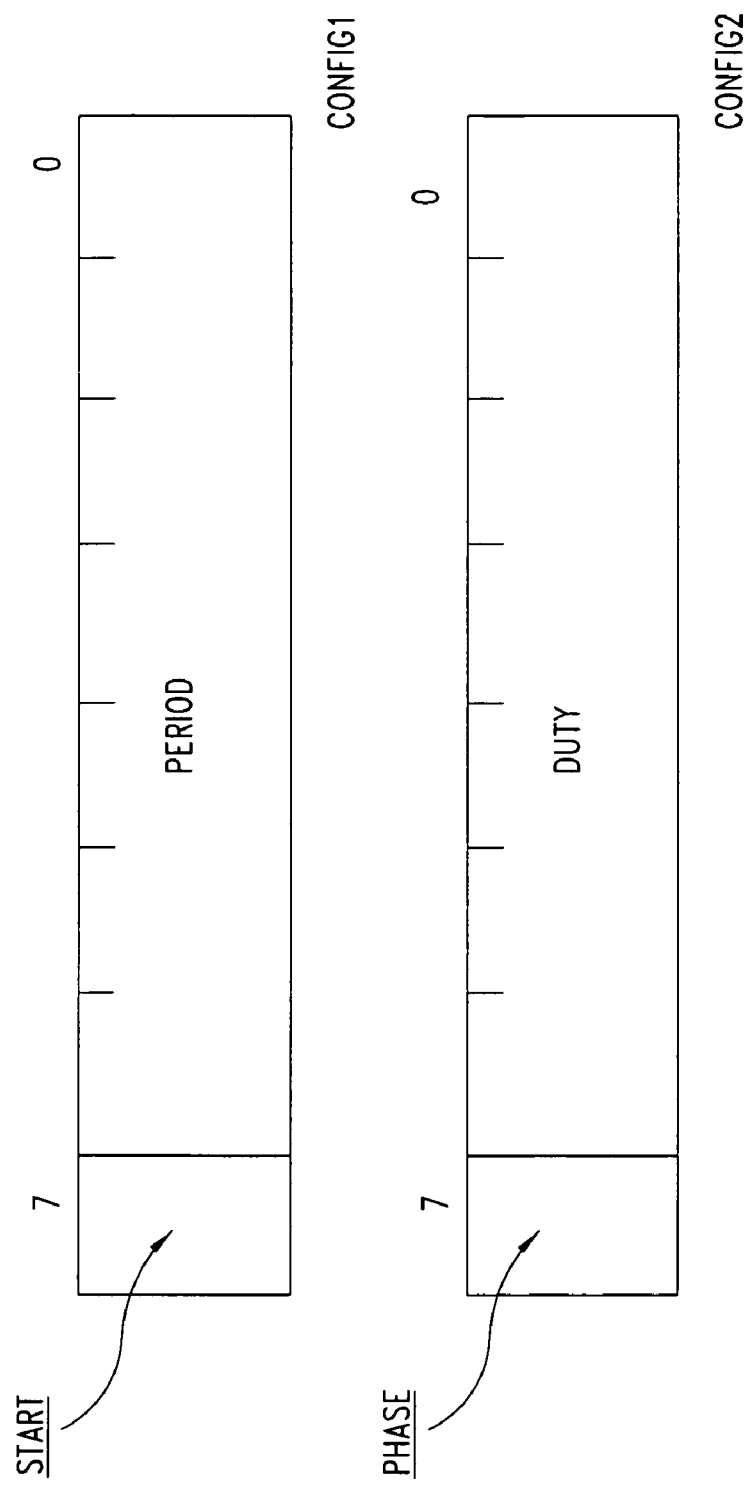
FIG. 4 schematically shows embodiments of two configuration registers that can be used in said modulator apparatus.

The first and the second configuration register CONF1 and CONF2 (schematically shown in FIG. 4) are, for example, two eight-bit registers. In particular, the first configuration register CONF1 is such to memorize in the first seven bits (that is in the seven least significant bits) a digital datum representative of the duration PERIOD of a symbol to be transmitted. The eighth bit (that is the most significant bit) of the first configuration register contains a binary datum, START, that when it assumes a set logic level (such as, for example, logical level 1) it will indicate the start of operation of the device FSM for generating the modulating signal MOD_OUT.

In accordance with the example described, the second configuration register CONF2 is such to store in the respective first seven bits a digital datum representative of the duty-cycle DUTY of a symbol to be transmitted.

The eighth bit of the second configuration register CONF2 contains a binary datum PHASE that can assume a level such (1 or 0) as to indicate, during operation, the starting logic level of the binary symbol, that is the logic level that it assumes initially and, in particular, for a time equal to DUTY.

As indicated in FIG. 2, the first and the second configuration register CONF1 and CONF2 are connected, respectively, to a first buffer register BUF_1 and a second buffer register BUF_2 used for storing during operation of the generation device FSM the duration PERIOD, duty-cycle DUTY and start level PHASE data relating to a symbol to be transmitted. Such buffer registers BUF_1 and BUF_2 make it possible to immediately make available the data stored therein to the device FSM at the start of the transmission of a new symbol even whilst the central control device CCD performs an update of the values contained in the first and second configuration register CONF1 and CONF2.

Figure 3B:
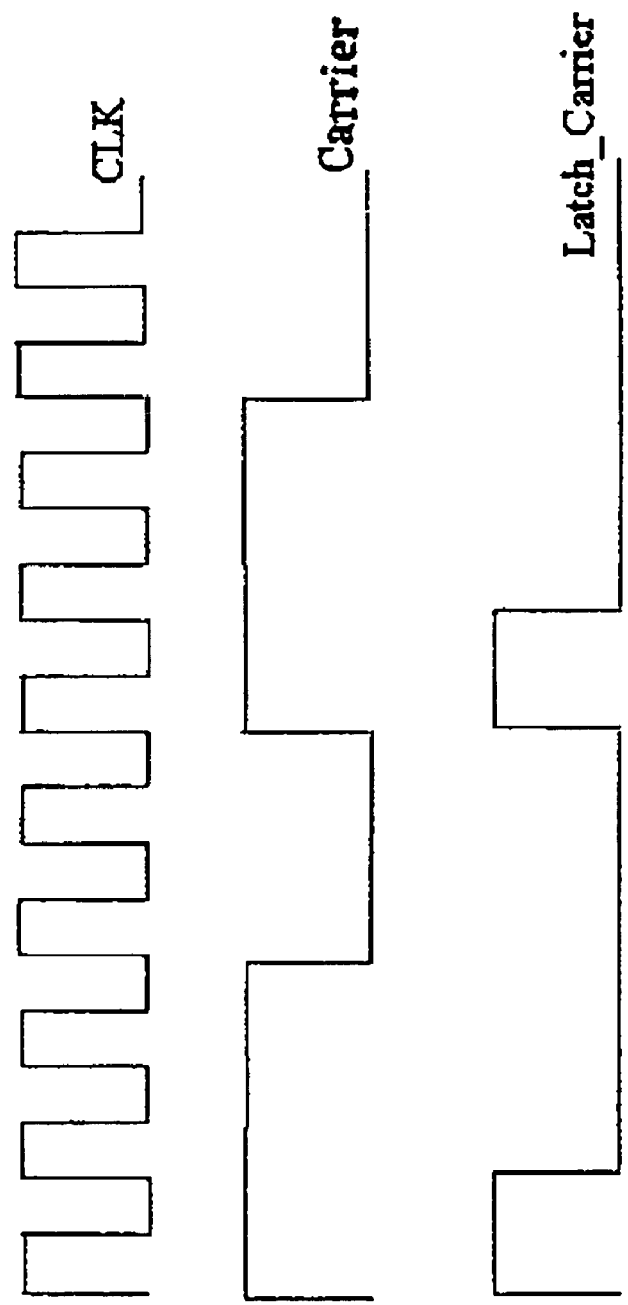
FIG. 3B shows example trends of a clock signal, the carrier signal and a latch signal.

Advantageously, the generation device FSM is a synchronous sequential network and, in particular, a finite states machine that on the basis of the particular state in which it is and on the basis of the values assumed by the quantities representative of the binary symbol to be transmitted generates a specific modulating signal MOD_OUT. In particular, the states machine FSM includes a counter such as of the increasing or up-counter type, which counts the pulses of an increase or latch signal obtained by the block Latch_Carrier starting from the electrical carrier signal Carr. With regards to this, FIG. 3B shows example trends of the clock signal CLK, the modulating signal Carr and the latch signal Latch_Carrier, which presents pulses having the rise front coinciding with the rise front of the pulses of the carrier signal Carr.

Besides, the states machine FSM enables to generate an interruption signal INT_RC at the start of the transmission of each symbol. This interruption signal INT_RC is used by the modulator apparatus 10 to update the first and the second buffer register BUF_1 and BUF_2 with the new values present in the two configuration registers CONF1 and CONF2 respectively (PERIOD, DUTY and PHASE). The interruption signal INT_RC is, besides, supplied to the central control device CCD as an interruption signal that signals the end of each symbol.

One output MOD of the states machine FSM that holds the modulating signal MOD_OUT is connected to a first input of the logic port AND to which the carrier electric signal Carr is also supplied. The logic port AND enables to combine the modulating signal MOD_OUT with the Carr carrier signal so as to obtain the modulated signal Sout to be sent to the emitter of infrared radiation LD.

It should be noted that the quantities that define the symbol to be transmitted (duration PERIOD and/or duty-cycle DUTY) are correlated to the period Tcarr of the carrier signal Carr. The duration PERIOD and the duty-cycle DUTY are integers and are whole multiples of the period Tcarr of the carrier signal Carr.

An example of an operating method of the modulator apparatus 10 will now be described. In this example, reference is made to the particular case of coding RC5 but the descriptive method is valid for a generic coding of the NRZ type (Non Zero return, that is any coding wherein in each symbol there is a single transition from 1 to 0) with period, optionally, different for the symbols '0' and '1.

Figure 5:
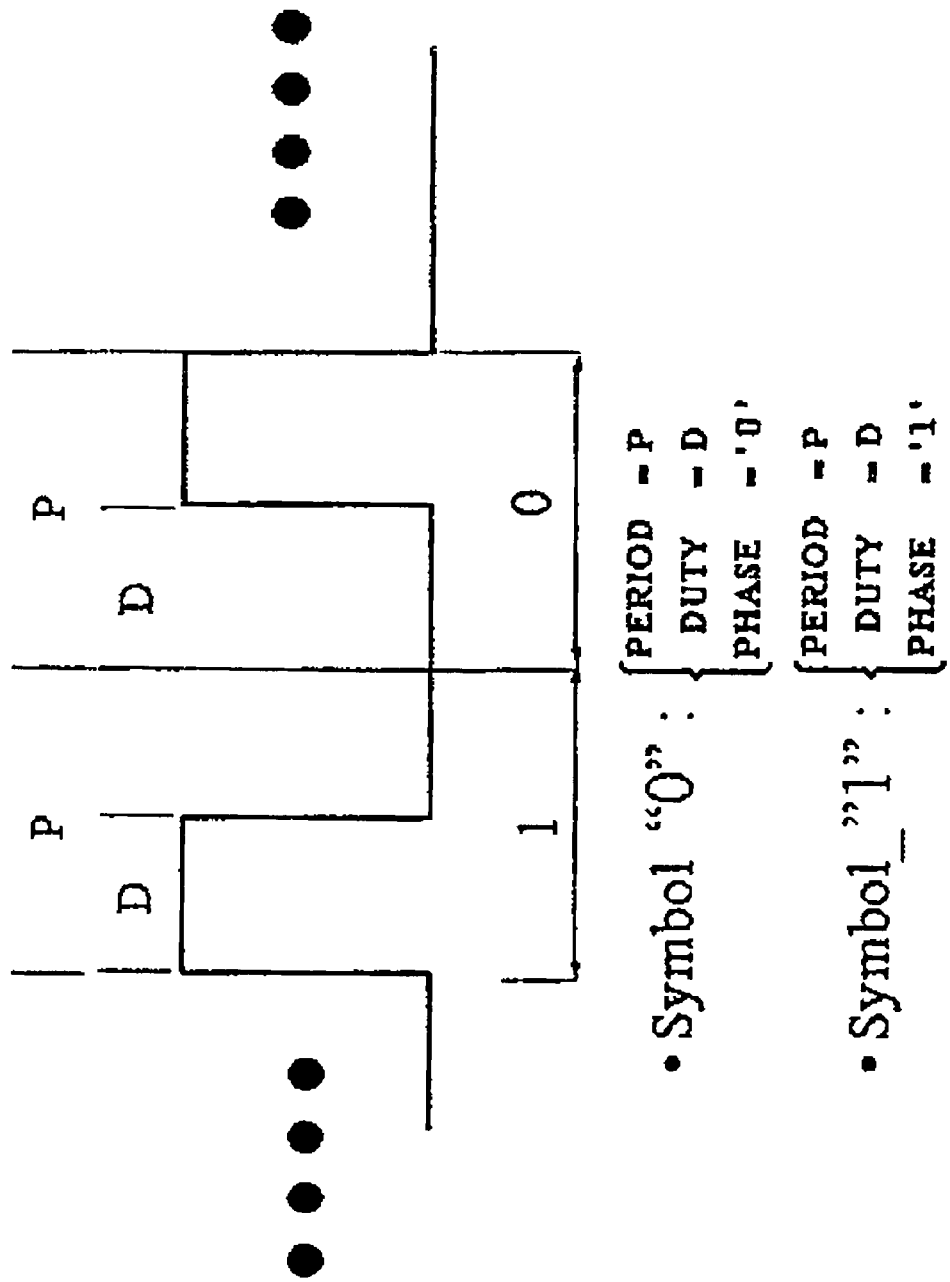
FIG. 5 shows the trend of the modulating signal in the case of coding RC5.

FIG. 5 shows the modulating signal MOD_OUT in the particular case of coding RC5. According to this coding, the symbols 0 and 1 have a same duration P (PERIOD=P) and the same duty-cycle D (DUTY=D) and are differentiated by the start logic level PHASE: for the symbol 0 the start level is low (PHASE="0"), and for the symbol 1 the start level is high (PHASE="1").

Figure 6:
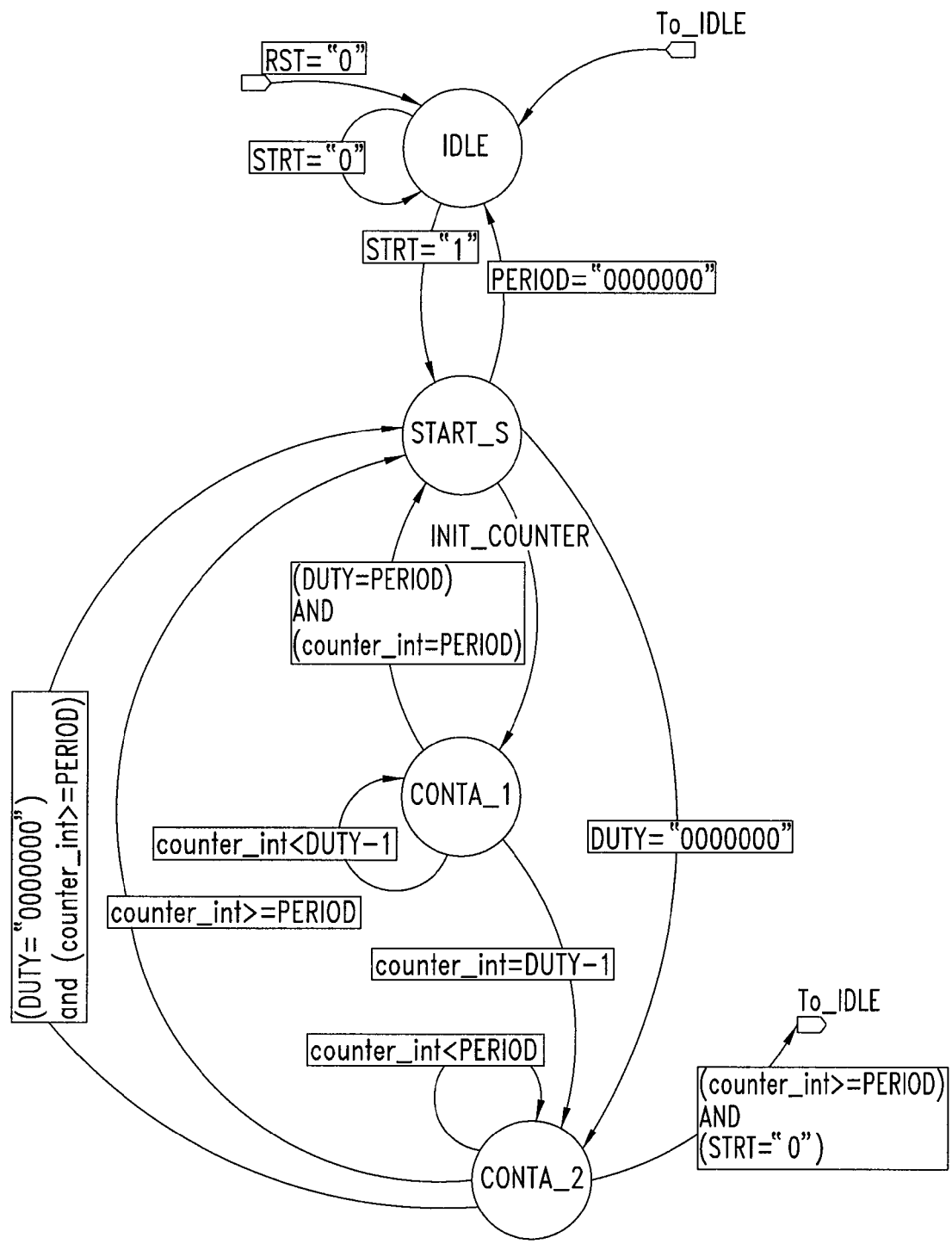
FIG. 6 shows a state diagram describing the example operation of a finite states machine that can be used in said modulator apparatus.

Reference is now also made to FIG. 6 wherein a state diagram is shown of the operation of the finite states machine FSM. As will be clear to those skilled in the art, the state diagram of FIG. 6 completely describes the machine itself and starting from it those skilled in the art can easily synthesize the states machine FSM by the abovementioned counter and with, for example, suitable flip-flops, logic ports and multiplexers.

Let's consider the case where the symbol 1 is initially transmitted according to the coding RC5 (PHASE=1).

The states machine FSM is such as to assume the following states:
IDLE state, that is a state of reset of the states machine FSM and in which the machine will remain as long as the value of the bit START of the first configuration register CONF1 is equal to zero;
start state START-S, that is the state in which the modulating signal MOD_OUT assumes the value of the bit PHASE of the second configuration register CONF_2 (MOD_OUT=PHASE) and the first and second buffer register BUF_1 and BUF_2 are updated with the values of PERIOD and DUTY contained in the first and second configuration register CONF1 and CONF2;
a first count state CONTA_1 in which the modulating signal MOD_OUT assumes the value PHASE and the states machine FSM performs a count from zero to the value DUTY-1;
a second count state CONTA_2 in which the modulating signal MOD_OUT assumes the value NOT(PHASE) and the states machine FSM performs a count of the value DUTY until the value PERIOD.

When the value of the bit START present in the first register CONF1 is equal to 1 then the states machine FSM performs the transition towards state START-S (transition STRT=1).

Advantageously, it has been provided that in the case in which the value of the duration PERIOD is equal to zero then the states machine FSM will return to the IDLE state (transition corresponding to the situation PERIOD=0000000), as no symbol of complete sense has been configured.

In the case in which, the duration PERIOD is different from zero and the value of the duty-cycle DUTY is different from zero, (transition INIT_COUNTER) the states machine FSM will evolve into the first count state CONTA_1.

The counter of the states machine FSM starts a count step and remains in state CONTA_1 until a corresponding current count value counter_int is less than value DUTY-1. When the states machine FSM remains in state CONTA_1 the modulating signal MOD_OUT present at the output thereof remains equal to the value PHASE, which is 1 according to the example considered.

In the case in which the values DUTY and PERIOD coincide (duty-cycle 100%), the states machine FSM will remain in state CONTA_1 and returns to the START state (thus generating the interruption signal INT_RC) when the inner count value counter_int of the same is equal to the value PERIOD.

When the count value counter-int is equal to the value DUTY-1 (but the value of the duration PERIOD is not exhausted) the states machine FSM will commute into the second count state CONTA_2 (transition counter-int=DUTY-1). Following this commutation, the modulating signal MOD_OUT is taken to the value NOT(PHASE) that is, according to the example considered to the value 0.

The states machine FSM remains in the second state CONTA_2 until the count value counter_int is less than the value of the duration PERIOD (counter_int<PERIOD) that is until the generation of a symbol has been completed.

Each time that the count value counter_int reaches the duration value PERIOD, the states machine FSM goes from the second count state CONTA_2 to the start state START and makes the interruption signal INT_RC commute from the value 0 to the value 1. This causes two buffer registers BUF_1 and BUF_2 to be updated with the new values of the quantities PERIOD, DUTY and PHASE present in the configuration registers CONF1 and CONF2. In this way one can start the transmission of a new symbol such as, for example, the symbol 0 shown as the second symbol in FIG. 5.

In the case of coding RC5, the interruption signal INT_RC is generated with a frequency $f_{RC}$ equal to the frequency of the carrier signal fcarr divided by the integer corresponding to the duration PERIOD.

From the second count state CONTA_2, if the count value counter_int is either greater or equal to the duration value PERIOD and the value of the bit START is equal to zero, the states machine FSM returns to the reset state IDLE thus enabling the completion of the transmission of the symbol in progress.

In the case in which one desires to have a zero duty-cycle (DUTY=0000000), from the start state START_S the states machine FSM evolves towards the count state CONTA_2, waiting a time equal to PERIOD before returning to the start state START_S after having emitted the interruption signal INT_RC. Thus the modulated signal MOD_OUT will remain the value NOT(PHASE) for the entire duration of the symbol (equal to PERIOD×Tcarr).

The modulator apparatus 10 and the transmitter 50 made in accordance with an embodiment of the invention have a number of advantages over the prior art. In fact, the generation of the modulated signal MOD_OUT is almost entirely entrusted to the modulator apparatus 10.

Therefore in relation to the conventional devices of the type in which the generation of the signal to be sent to the emitter LD takes place in software mode, the microcontroller μC processing is considerably reduced thus leading to a more accurate use of the same. The operations necessary for generating the modulating signal MOD_OUT are performed by the states machine FSM that operates in a more rapid way than the microcontroller μC can via software. The relative high operative speed of the states machine FSM is also due to the possibility thereof of operating on the basis of a not high number of quantities that can vary from one symbol to another such as the duration parameters of the symbol PERIOD and/or the duty-cycle DUTY and/or the start logic level PHASE.

Besides, the use of the states machine FSM is extremely advantageous compared to modulators or codifiers made with discrete elements or combining machines because it enables to use the transmitter not only for a preset type of coding but also enables either to adapt it or reconfigure it for codings of different types.

In fact, further to the coding RC5 the transmitter 50 can be configured for other types of coding such as: Pulse Coding, Space Coding, Shift Coding.

Figure 7B:
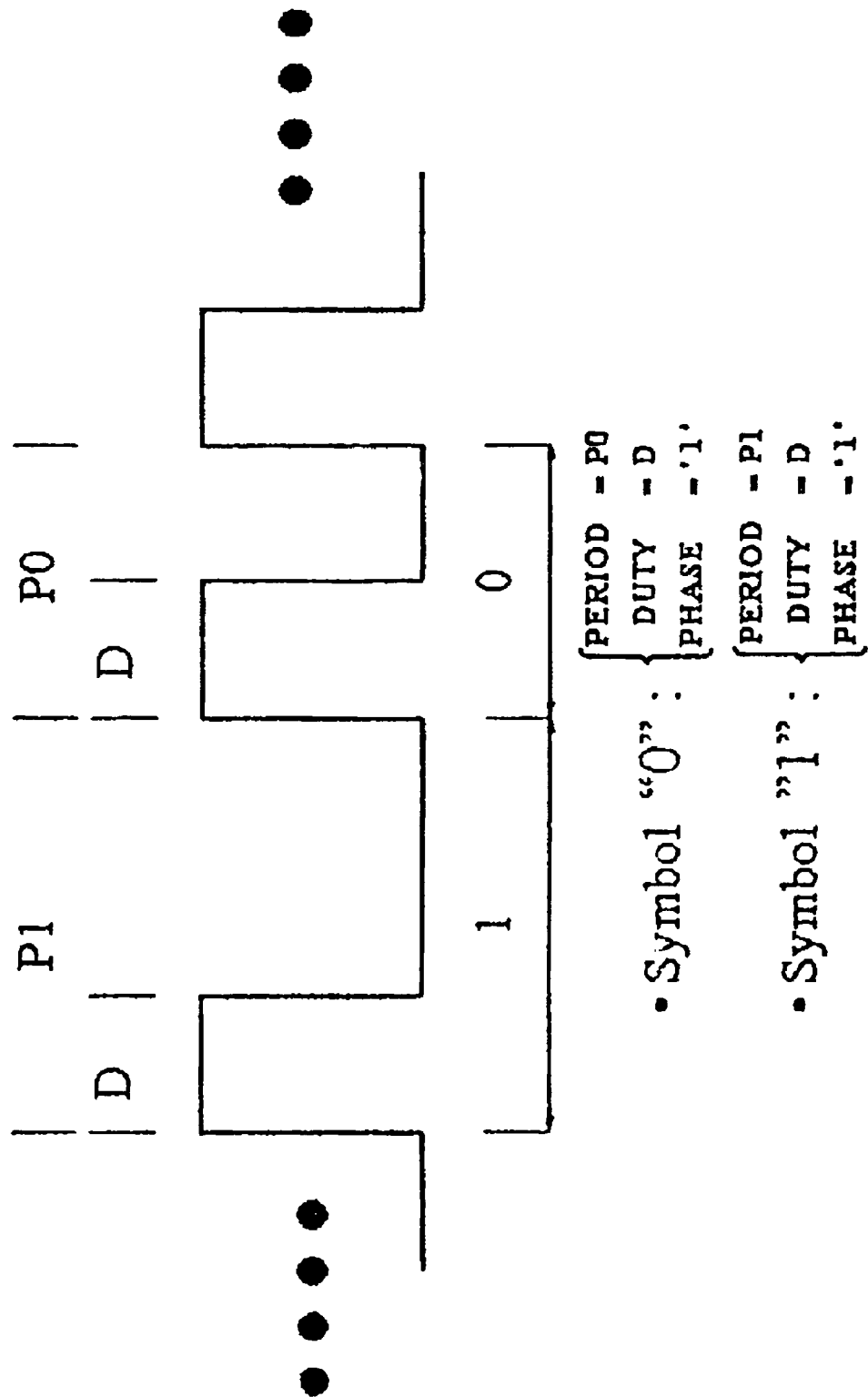
Figure 7C:
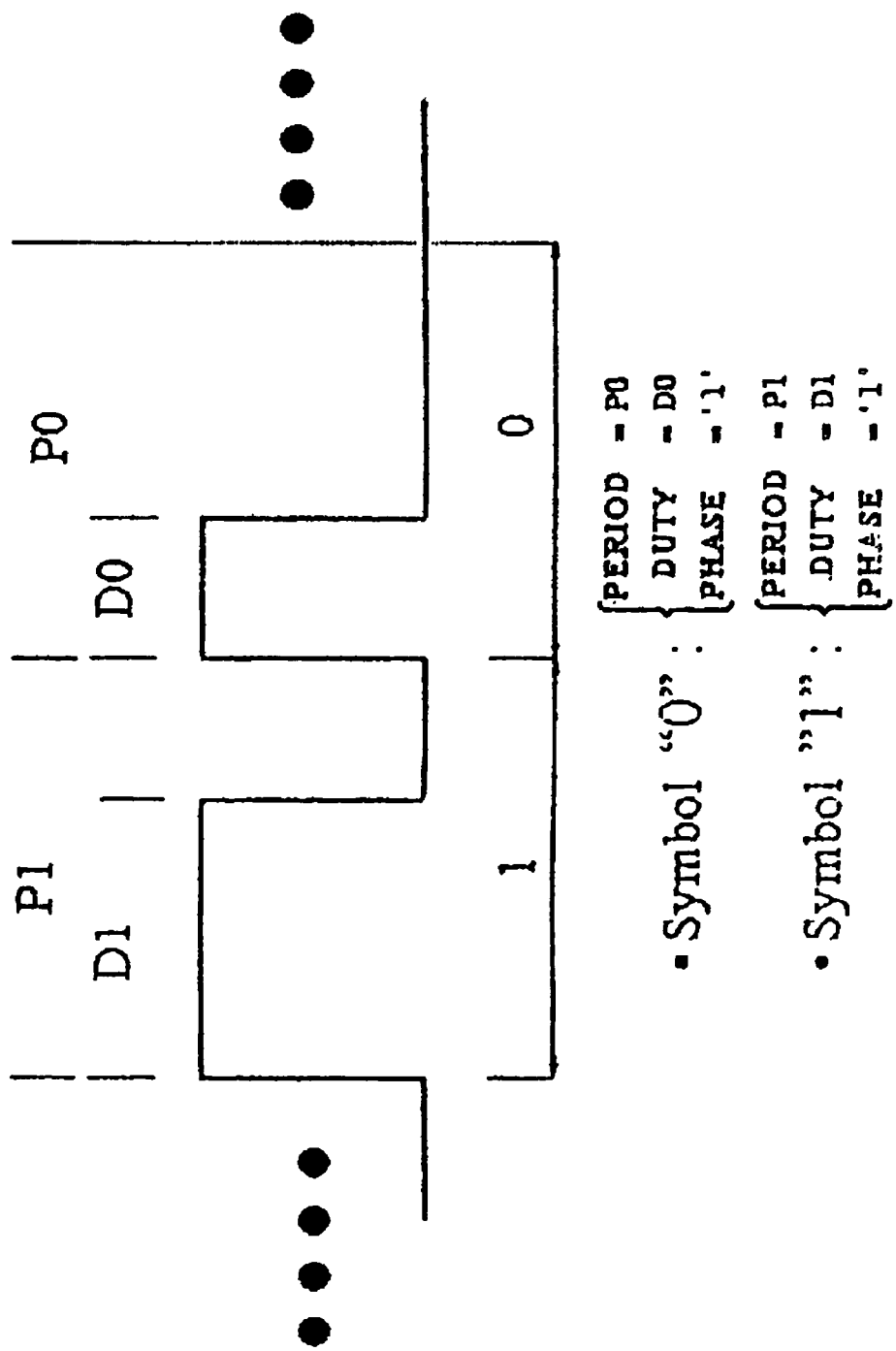

FIGS. 7A, 7B, 7C indicate the coding modes of the symbol 1 and the symbol 0 for each of the codings listed above, thus showing the trend of the corresponding modulating signal MOD_OUT.

In particular, FIG. 7A refers to the coding Pulse Coding according to which the symbol 0 and the symbol 1 have separate durations and duty-cycle and the same start value PHASE=1. In fact the symbol 0 is defined by a duration PERIOD equal to P0 and a duty-cycle DUTY equal to D0 whilst the symbol 1 has duration PERIOD equal to P1 and duty-cycle DUTY equal to D1.

FIG. 7B refers to the case of Space Coding that provides that the symbols 0 and 1 present the same start value PHASE=1, the same duty-cycle DUTY=D and different durations P0 and P1.

As shown clearly in FIG. 7C, in the case of Shift Coding the symbols 0 and 1 have the same initial value (PHASE=1) and different duration, P0 and P1, and duty-cycle, D0 and D1 values.

As will be clear to those skilled in the art, the state diagram of FIG. 6 may also be applied to these further types of coding by configuring the first and second register CONF1 and CONF2 with the corresponding PERIOD, DUTY and PHASE values depending on the particular coding that one intends to use.

It should be noted that the reconfigurability of the modulator apparatus 10, that enables to vary the type of coding, are not obtainable from the conventional apparatus that makes use of discreet electronic components.

Advantageously, the teachings of the present invention can also be applied to the case in which the duration PERIOD can vary from one symbol to the other and within the same symbol, there can be more than one transition from level 1 to that of 0 or vice versa (RZ type coding, Return to Zero/to One).

Figure 8:
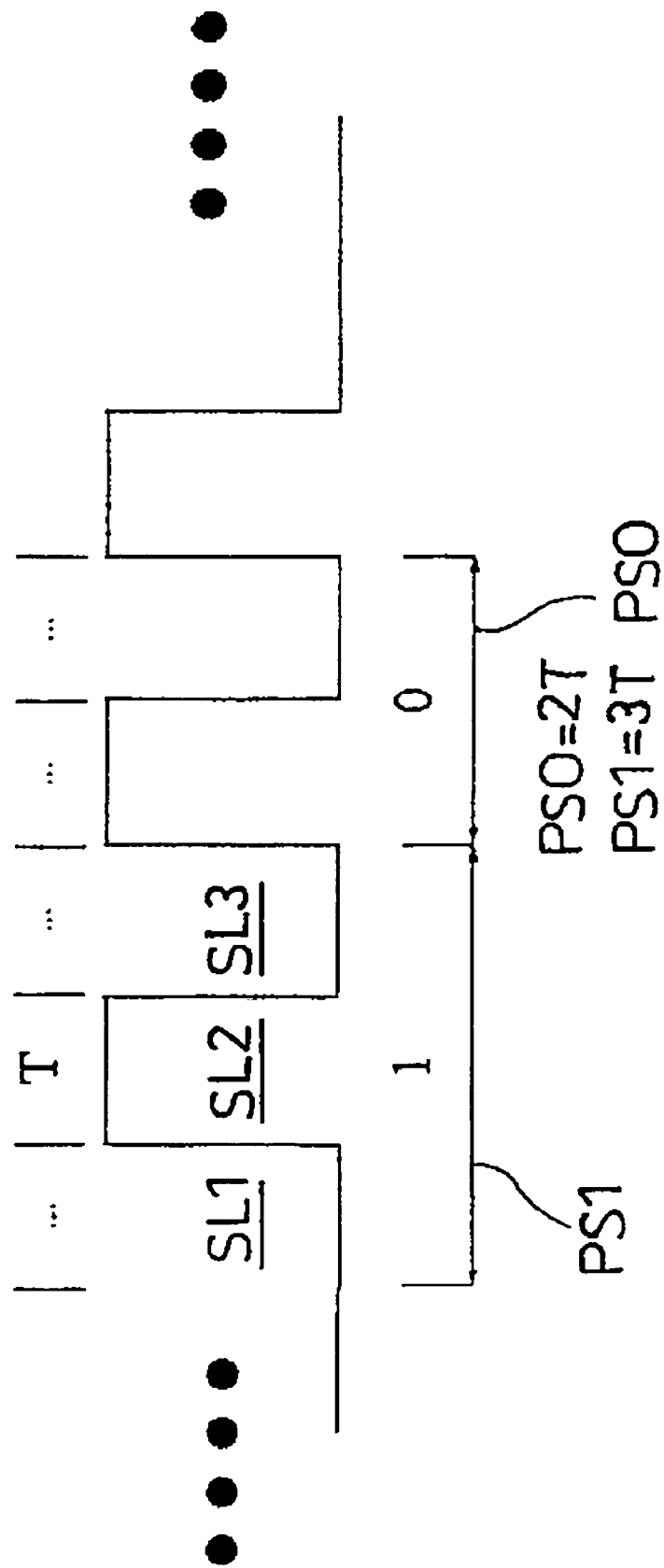
FIG. 8 shows the trend of the modulating signal in the case of an RZ type coding.

FIG. 8 shows the trend of the modulating signal MOD_OUT for the symbols 1 and 0, in the case of coding RZ. The symbol 1 had an overall duration PS1, whereas the symbol 0 has another duration PS0, lower than the previous one. Besides, the duration of the symbol 1 can be subdivided into three intervals or slots of duration T. More precisely, for the symbol 1 the signal MOD_OUT of FIG. 8 assumes:

the low logic level, for the first slot SL1;
the high logic level, in the second slot SL2;
the low logic level, in the last slot SL3.

The symbol 0 has a duration PS0 equal to twice duration T of a slot and the modulating signal MOD_OUT assumes the low logic level, for the first slot and the low logic level in the second slot.

In this case, the states machine FSM can still be used for generating the modulating signal in accordance with coding RZ, thus foreseeing that it operates with the value of quantity PERIOD stored in the first configuration register CONF1 equal to T (PERIOD=T), and changing the value of the start logic level PHASE according to whether the logic level of the single slot is high or low (PHASE=1 for slot with high logic level; PHASE=0 for slot with low logic level. The 7 bits of the quantity DUTY, stored in the second configuration register CONF2, will all assume the value 1.

The update of the bit of the second register CONF2 relating to quantity PHASE is performed by the central control device CCD of the microcontroller µC by the performance of a suitable software routine. In the particular case of "slot" transmission, the interruption signal INT_R (generated at the start of each slot and provided to the central control device CCD) can be used for performing a corresponding instruction suitable to update the values of the quantity PHASE to be loaded in the second register CONF2.

It should be noted that the possibility of using a coding RZ is innovative in the field of remote control systems and the teachings of the invention enable to make it in a particularly rapid way without an excessive effect on the processing and calculation tasks entrusted to the control microcontroller µC.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A transmitter device of a remote control system, the transmitter device configured to emit a radiation corresponding to an infrared modulated digital signal and the transmitter device including a control device to generate at least one configuration signal indicative of at least one characteristic quantity of said infrared modulated signal correlated to an information to be transmitted, the transmitter device comprising:

a modulator apparatus coupled to the control device and including a synchronous sequential network having a finite state machine, the modulator apparatus being configured to generate the infrared modulated signal using said finite state machine and based on said at least one characteristic quantity supplied by the control device, wherein the modulator apparatus includes:

a carrier generation component to generate a carrier signal and coupled to the synchronous sequential network to provide a latch signal thereto; and a logic device coupled to the synchronous sequential network to receive a modulating signal and coupled to the carrier generation component to receive the carrier signal, the logic device configured to produce the modulated signal from the received modulating and carrier signals.

2. The transmitter device according to claim 1 wherein the sequential network is provided with at least one input for digital configuration data representative of said at least one characteristic quantity and at least one output for a digital modulating signal of a pulse type and function of the digital configuration data, the modulating signal being combinable with a carrier signal in order to obtain said modulated signal.

3. The transmitter device according to claim 1 wherein said modulated signal represents binary symbols, said at least one characteristic quantity is indicative of at least one of the following parameters of a binary symbol or a portion of a binary symbol: duration, duty-cycle, start logic level.

4. The transmitter device according to claim 2 wherein the modulator apparatus includes at least one storage unit coupled to the control device to store the digital configuration data and making the digital configuration data available to said sequential network.

5. The transmitter device according to claim 4 wherein said storage unit includes at least a first reconfigurable register to configure the digital configuration data.

6. The transmitter device according to claim 1 wherein said modulator apparatus is configured to generate said modulated signal so that the modulated signal is coded according to at least one of the following codings: Pulse Coding; Space Coding, Shift Coding, RC5 Coding RZ and NRZ codings.

7. The transmitter device according to claim 5 wherein the first register is reconfigurable by said control device in order to replace at least one of the digital configuration data with at least one further digital configuration datum, this replacement being performable with a varying of a binary symbol to be transmitted and/or with the varying of the binary coding to be implemented.

8. The transmitter device according to claim 1 wherein the sequential network is configured to generate an interruption signal to feed to the control device in order to signal a start of a transmission of a subsequent binary symbol.

9. The transmitter device according to claim 2 wherein the sequential network includes a count signal counter and is such to assume two separate states of count wherein the digital modulating signal assumes a low logic value and a high logic value.

10. The transmitter device according to claim 3 wherein the sequential network is configured to assume:
a first count state in which it remains for a first interval of time correlated to a duty-cycle thus maintaining the modulating signal at a logic level equal to said start logic level; and
a second count state in which it remains for a second interval of time correlated to a difference between said duration of the binary symbol and the duty-cycle thus maintaining the modulating signal at a further logic level opposite to the start logic level.

11. The transmitter device according to claim 3 wherein the modulator apparatus includes a combination unit coupled electrically to said sequential network in order to combine the modulating digital signal with said carrier signal and form said modulated signal.

12. The transmitter device according to claim 11 wherein said carrier signal is a square wave having a carrier period, said duration of the binary symbol and said duty-cycle of the binary symbol being expressible as whole multiples of a carrier period.

13. The transmitter device according to claim 8 wherein the first register is configured to store a digital datum indicative of a duration of a binary symbol represented by the modulated signal and the modulator apparatus comprises a second register to store a digital datum indicative of a duty-cycle of the binary symbol.

14. The transmitter device according to claim 13, further including at least one buffer register connected to the first register to store the digital datum contained in said first register and to relate to a subsequent binary symbol and to make it available to the sequential network as soon as transmission of a preceding binary symbol is complete.

15. The transmitter device according to claim 1 wherein said control device and said modulator apparatus are integrated on the same plate of semi-conductor material.

16. A modulator apparatus to generate an infrared modulated digital signal of a transmitter device in a remote control system, the infrared modulated signal being definable by at least one characteristic quantity correlated to an information to be transmitted, the modulator apparatus comprising a sequential synchronous network having a finite state machine to generate a modulating digital signal to be combined with a carrier signal so as to obtain the infrared modulated signal, the sequential network capable to generate the modulating signal based on digital data corresponding to said at least one characteristic quantity, wherein the modulator apparatus includes:
a carrier generation component to generate the carrier signal and coupled to the synchronous sequential network to provide a latch signal thereto; and
a logic device having input terminals coupled to the synchronous sequential network to receive the modulating signal and coupled to the carrier generation component to receive the carrier signal, the logic device having an output terminal to provide the modulated signal from the received modulating and carrier signals.

17. The modulator apparatus according to claim 16 wherein said digital modulating signal is of a pulse type and represents binary symbols, said at least characteristic quantity is indicative of at least one of the following parameters of a binary symbol or a portion of a binary symbol: duration, duty-cycle, initial logical level.

18. The modulator apparatus according to claim 17, further including at least one storage unit coupled to a control device in order to store the digital data and make it available to said sequential network.

19. The modulator apparatus according to claim 18 wherein said storage unit includes at least a first reconfigurable register for storing the digital configuration data.

20. The modulator apparatus according to claim 16 wherein said modulated signal is generated so that it is coded according to at least one of the following codings: Pulse Coding; Space Coding, Shift Coding, RC5 Coding, RZ and NRZ type coding.

21. The modulator apparatus according to claim 16 wherein said finite state machine is a hardware device integrated on semiconductor material.

22. A method for generating a modulated digital signal to be supplied to a radiation emitter of a transmitter in a remote control system, the method comprising:
supplying, from a control device, first and second digital data representative of a first and second binary symbol to be coded in the modulated digital signal;
generating in a modulating device an infrared electrical carrier signal;
feeding the first digital data to a synchronous sequential network having a finite state machine in order to generate a first modulating signal representative of first said symbol;
performing, under control of the modulating device, a first operation of combination of the first modulating signal with the infrared carrier signal in order to obtain the modulated signal that transports said first symbol;
feeding the second digital data to the sequential network in order to generate a second modulating signal representative of said second symbol; and
performing, under control of the modulating device, a second operation of combination of the second modulating signal and the infrared carrier to obtain the modulated signal that transports said second symbol.

23. The method of claim 22 wherein feeding the first and second digital data to the synchronous sequential network includes providing the first and second digital data to said finite state machine, which is a hardware device integrated on semiconductor material.

24. The method of claim 22 wherein generating the first and second modulating signals include generating the modulating signals based on at least one of duty cycle, phase, and period information.

25. A remote control system, comprising:
a transmitter device to provide an infrared wireless signal corresponding to a modulated signal;
a control device included with the transmitter device to generate at least one configuration signal indicative of at least one characteristic that is correlated to information to be transmitted; and
a modulator device included in the transmitter device and coupled to the control device to receive the configuration signal and having a synchronous sequential network having a finite state machine to generate a modulating signal in response to the configuration signal and based on the characteristic indicated by the configuration signal, the modulator being coupled to generate the modulated signal from the modulating signal and from a carrier signal, wherein the modulator device includes:
a carrier generation component to generate the carrier signal and coupled to the synchronous sequential network to provide a latch signal thereto; and
a logic device having input terminals coupled to the synchronous sequential network to receive the modulating signal and coupled to the carrier generation component to receive the carrier signal, the logic device having an output terminal to provide the modulated signal from the received modulating and carrier signals.

26. The remote control system of claim 25, further comprising a receiver device to receive the infrared wireless signal, corresponding to the generated modulated signal, from the transmitter device.

27. The remote control system of claim 25 wherein the finite state machine is a hardware device integrated on a same semiconductor material along with said control device.

28. The remote control system of claim 25 wherein the modulator device further includes:
at least one storage unit coupled to the control device to store configuration data provided by the configuration signal, the configuration data corresponding to the characteristic; and
at least one buffer correspondingly coupled to the at least one storage unit to provide the configuration data from the at least one storage unit to the synchronous sequential network.

29. A remote control system, comprising:
means for providing binary symbol information;
means for providing a carrier signal;
synchronous sequential network means, having a finite state machine, for generating an infrared modulating signal using the binary symbol information and the carrier signal, the synchronous sequential network reconfiguring generation of the modulating signal based on a type of coding; and
means for providing a modulated signal to a receiver system, including a logic device coupled to the synchronous sequential network means to receive the modulating signal and coupled to the means for providing a carrier signal to receive the carrier signal, the logic device configured to provide the modulated signal from the received modulating and carrier signals.

30. The system of claim 29 wherein the binary symbol information includes any one or more of duty cycle information, phase information, or period information.

31. The system of claim 29 wherein the finite state machine is a hardware device integrated on semiconductor material.

32. The transmitter device according to claim 1 wherein said finite state machine is a hardware device integrated on a same semiconductor material along with said control device.

* * * * *

UNITED STATES PATENT AND TRADEMARK OFFICE
CERTIFICATE OF CORRECTION

PATENT NO. : 7,593,358 B2 Page 1 of 1
APPLICATION NO. : 11/067461
DATED : September 22, 2009
INVENTOR(S) : Inglese et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1158 days.

Signed and Sealed this

Twenty-first Day of September, 2010

David J. Kappos
*Director of the United States Patent and Trademark Office*